United States Patent
Chen et al.

(10) Patent No.: US 9,344,421 B1
(45) Date of Patent: *May 17, 2016

(54) USER ACCESS AUTHENTICATION BASED ON NETWORK ACCESS POINT

(71) Applicant: A10 Networks, Inc., San Jose, CA (US)

(72) Inventors: Lee Chen, Saratoga, CA (US); John Chiong, San Jose, CA (US); Yang Yu, San Jose, CA (US)

(73) Assignee: A10 Networks, Inc., San Jose, CA (US)

( * ) Notice: Subject to any disclaimer, the term of this patent is extended or adjusted under 35 U.S.C. 154(b) by 42 days.

This patent is subject to a terminal disclaimer.

(21) Appl. No.: 14/290,914

(22) Filed: May 29, 2014

Related U.S. Application Data

(63) Continuation of application No. 13/423,953, filed on Mar. 19, 2012, now Pat. No. 8,782,751, which is a continuation of application No. 11/435,043, filed on May 16, 2006, now Pat. No. 8,151,322.

(51) Int. Cl.
*H04L 29/06* (2006.01)

(52) U.S. Cl.
CPC .................................... *H04L 63/08* (2013.01)

(58) Field of Classification Search
None
See application file for complete search history.

(56) References Cited

U.S. PATENT DOCUMENTS

| | | | |
|---|---|---|---|
| 5,541,994 A | 7/1996 | Tomko et al. |
| 5,712,912 A | 1/1998 | Tomko et al. |
| 5,737,420 A | 4/1998 | Tomko et al. |
| 5,757,916 A | 5/1998 | MacDoran et al. |
| 5,832,091 A | 11/1998 | Tomko et al. |
| 5,991,408 A | 11/1999 | Pearson et al. |
| 6,035,398 A | 3/2000 | Bjorn |
| 6,167,517 A | 12/2000 | Gilchrist et al. |
| 6,182,146 B1 | 1/2001 | Graham-Cumming, Jr. |
| 6,182,221 B1 | 1/2001 | Hsu et al. |
| 6,219,793 B1 | 4/2001 | Li et al. |

(Continued)

FOREIGN PATENT DOCUMENTS

| | | |
|---|---|---|
| CN | 1449618 | 10/2003 |
| CN | 101361037 | 2/2009 |

(Continued)

OTHER PUBLICATIONS

Monrose et al., "Cryptographic Key Generation from Voice," Proceedings of the 2001 IEEE Symposium on Security and Privacy, pp. 202-213, May 2001.

(Continued)

*Primary Examiner* — David Le
(74) *Attorney, Agent, or Firm* — Carr & Ferrell LLP

(57) ABSTRACT

Systems and methods of authenticating user access based on an access point to a secure data network include a secure data network having a plurality of a network access points serving as entry points for a user to access the secure data network using a user device. The user is associated with a user identity, each network access point with a network access point identity. The user uses a user device to send an access request, requesting access to the secure data network, to the network access point, which then sends an authentication request to an identity server. The identity server processes the authentication request, by validating the combination of the user identity and the network access point identity, and responds with an authentication response, granting or denying access, as communicated to the user device via an access response.

32 Claims, 6 Drawing Sheets

(56) References Cited

U.S. PATENT DOCUMENTS

| | | | |
|---|---|---|---|
| 6,219,794 B1 | 4/2001 | Soutar et al. |
| 6,310,966 B1 | 10/2001 | Dulude et al. |
| 6,317,834 B1 | 11/2001 | Gennaro et al. |
| 6,490,624 B1 | 12/2002 | Sampson et al. |
| 6,507,912 B1 | 1/2003 | Matyas, Jr. et al. |
| 6,714,931 B1 | 3/2004 | Papierniak et al. |
| 6,748,084 B1 | 6/2004 | Gau et al. |
| 6,901,145 B1 | 5/2005 | Bohannon et al. |
| 6,950,651 B2 | 9/2005 | Seligmann |
| 7,095,852 B2 | 8/2006 | Wack et al. |
| 7,133,916 B2 | 11/2006 | Schunemann |
| 7,155,514 B1 | 12/2006 | Milford |
| 7,237,267 B2 | 6/2007 | Rayes et al. |
| 7,360,237 B2 | 4/2008 | Engle et al. |
| 7,376,969 B1 | 5/2008 | Njemanze et al. |
| 7,480,934 B2 | 1/2009 | Chan et al. |
| 7,484,089 B1 | 1/2009 | Kogen et al. |
| 7,551,574 B1 | 6/2009 | Peden, II et al. |
| 7,552,126 B2 | 6/2009 | Chen et al. |
| 7,613,829 B2 | 11/2009 | Alve |
| 7,647,635 B2 | 1/2010 | Chen et al. |
| 7,653,633 B2 | 1/2010 | Villella et al. |
| 7,716,378 B2 | 5/2010 | Chen et al. |
| 7,804,956 B2 | 9/2010 | Chang et al. |
| 7,979,585 B2 | 7/2011 | Chen et al. |
| 8,104,091 B2 | 1/2012 | Qin et al. |
| 8,122,152 B2 | 2/2012 | Chittenden et al. |
| 8,151,322 B2 | 4/2012 | Chen et al. |
| 8,423,676 B2 | 4/2013 | Chen et al. |
| 8,595,383 B2 | 11/2013 | Chen et al. |
| 8,782,751 B2 | 7/2014 | Chen et al. |
| 8,813,180 B1 | 8/2014 | Chen et al. |
| 8,868,765 B1 | 10/2014 | Chen et al. |
| 8,903,986 B1 | 12/2014 | Newstadt et al. |
| 9,060,003 B2 | 6/2015 | Wang et al. |
| 9,122,853 B2 | 9/2015 | Thompson |
| 2001/0022558 A1 | 9/2001 | Karr, Jr. et al. |
| 2002/0095587 A1 | 7/2002 | Doyle et al. |
| 2003/0023874 A1 | 1/2003 | Prokupets et al. |
| 2003/0101349 A1 | 5/2003 | Wang |
| 2003/0105859 A1 | 6/2003 | Garnett et al. |
| 2003/0140232 A1 | 7/2003 | De Lanauze |
| 2003/0140235 A1 | 7/2003 | Immega et al. |
| 2003/0191989 A1 | 10/2003 | O'Sullivan |
| 2003/0219121 A1 | 11/2003 | van Someren |
| 2004/0015243 A1 | 1/2004 | Mercredi et al. |
| 2004/0034784 A1 | 2/2004 | Fedronic et al. |
| 2004/0049687 A1 | 3/2004 | Orsini et al. |
| 2004/0059924 A1 | 3/2004 | Soto et al. |
| 2004/0081173 A1 | 4/2004 | Feather |
| 2004/0153553 A1 | 8/2004 | Chotkowski et al. |
| 2004/0167912 A1 | 8/2004 | Tsui et al. |
| 2004/0194114 A1 | 9/2004 | Spiegel |
| 2004/0224664 A1 | 11/2004 | Guo |
| 2004/0242200 A1 | 12/2004 | Maeoka et al. |
| 2004/0254919 A1 | 12/2004 | Giuseppini |
| 2004/0260651 A1 | 12/2004 | Chan et al. |
| 2005/0009520 A1 | 1/2005 | Herrero et al. |
| 2005/0010930 A1 | 1/2005 | Vaught |
| 2005/0018618 A1 | 1/2005 | Mualem et al. |
| 2005/0086502 A1 | 4/2005 | Rayes et al. |
| 2005/0089048 A1 | 4/2005 | Chittenden et al. |
| 2005/0108518 A1 | 5/2005 | Pandya |
| 2005/0114186 A1 | 5/2005 | Heinrich |
| 2005/0114321 A1 | 5/2005 | DeStefano et al. |
| 2005/0144480 A1 | 6/2005 | Kim et al. |
| 2005/0182969 A1 | 8/2005 | Ginter et al. |
| 2005/0204162 A1 | 9/2005 | Rayes et al. |
| 2005/0283609 A1 | 12/2005 | Langford |
| 2006/0069687 A1 | 3/2006 | Cui et al. |
| 2006/0077926 A1 | 4/2006 | Rune |
| 2006/0083372 A1 | 4/2006 | Chang et al. |
| 2006/0140452 A1 | 6/2006 | Raynor et al. |
| 2006/0165226 A1 | 7/2006 | Ernst et al. |
| 2006/0173977 A1 | 8/2006 | Ho et al. |
| 2007/0011300 A1 | 1/2007 | Hollebeek et al. |
| 2007/0032247 A1 | 2/2007 | Shaffer et al. |
| 2007/0067441 A1 | 3/2007 | Pomerantz |
| 2007/0067838 A1 | 3/2007 | Bajko |
| 2007/0121560 A1 | 5/2007 | Edge |
| 2007/0179986 A1 | 8/2007 | Adam |
| 2007/0180101 A1 | 8/2007 | Chen et al. |
| 2007/0206746 A1 | 9/2007 | Andreasson et al. |
| 2007/0271598 A1 | 11/2007 | Chen et al. |
| 2007/0282855 A1 | 12/2007 | Chen et al. |
| 2007/0283141 A1 | 12/2007 | Pollutro et al. |
| 2007/0294209 A1 | 12/2007 | Strub et al. |
| 2008/0002684 A1 | 1/2008 | Kumazawa et al. |
| 2008/0080398 A1 | 4/2008 | Yasuie et al. |
| 2008/0104276 A1 | 5/2008 | Lahoti et al. |
| 2008/0109887 A1 | 5/2008 | Chen et al. |
| 2008/0130898 A1 | 6/2008 | Holtmanns et al. |
| 2008/0148357 A1 | 6/2008 | Chen et al. |
| 2008/0229418 A1 | 9/2008 | Chen et al. |
| 2008/0263626 A1 | 10/2008 | Bainter et al. |
| 2009/0047952 A1 | 2/2009 | Giaretta et al. |
| 2009/0213763 A1 | 8/2009 | Dunsmore et al. |
| 2009/0292924 A1 | 11/2009 | Johnson et al. |
| 2010/0153544 A1 | 6/2010 | Krassner et al. |
| 2010/0159955 A1 | 6/2010 | Aerrabotu |
| 2010/0217819 A1 | 8/2010 | Chen et al. |
| 2011/0055913 A1 | 3/2011 | Wong |
| 2011/0239289 A1 | 9/2011 | Wang et al. |
| 2012/0204236 A1 | 8/2012 | Chen et al. |
| 2012/0216266 A1 | 8/2012 | Wang et al. |
| 2013/0036342 A1 | 2/2013 | Deo et al. |
| 2014/0059702 A1 | 2/2014 | Wang et al. |
| 2014/0143149 A1 | 5/2014 | Aissi |
| 2014/0229268 A1 | 8/2014 | Clapp et al. |
| 2014/0347479 A1 | 11/2014 | Givon |
| 2014/0380424 A1 | 12/2014 | Thompson |
| 2015/0012746 A1 | 1/2015 | Kulkarni et al. |
| 2015/0312237 A1 | 10/2015 | Wang et al. |

FOREIGN PATENT DOCUMENTS

| | | |
|---|---|---|
| CN | 101375253 | 2/2009 |
| CN | 102098316 | 6/2011 |
| CN | 102123156 | 7/2011 |
| CN | ZL 200780001795.6 | 7/2011 |
| CN | ZL 200780001775.9 | 9/2011 |
| CN | ZL2011100683067 | 11/2014 |
| CN | ZL2011100683090 | 9/2015 |
| TW | NI175810 | 4/2003 |
| TW | I249314 | 2/2006 |
| WO | 02/21788 | 3/2002 |
| WO | 2008067013 | 6/2008 |
| WO | 2008070248 | 6/2008 |
| WO | WO2014209660 | 12/2014 |

OTHER PUBLICATIONS

Shamir, "How to share a secret," Communications of the ACM, vol. 22, No. 11, pp. 612-613, Nov. 1979.

Jermyn et al., "The Design and Analysis of Graphical Passwords," 8th USENIX Security Symposium ; Aug. 1999; 15 pages.

Soutar et al.; "Biometric Encryption™", 1999; pp. 1-28.

Duda et al., "Pattern Classification," Second Edition; 2001; pp. 117-121.

Zhang et al.; "Personal Authentication Based on Generalized Symmetric Max Minimal Distance in Subspace," 2003; IEEE; pp. 245-248.

Okada et al.; "An Optimal Orthonormal System for Discriminant Analysis"; 1985; Pattern Recognition, vol. 18, No. 2; pp. 139-144.

Chang et al.; "Biometrics-Based Cryptographic Key Generation," In Multimedia and Expo, Jun. 2004. ICME'04. 2004 IEEE International Conference on (vol. 3, pp. 2203-2206). IEEE.

Zhang et al.; "Optimal Thresholding for Key Generation Based on Biometrics," In Image Processing, Oct. 2004. ICIP'04. 2004 International Conference on (vol. 5, pp. 3451-3454). IEEE.

(56) References Cited

OTHER PUBLICATIONS

"How to Create a Rule in Outlook 2003" CreateaRule-Outlook2003.doc 031405 mad.

WFLOGS, Dec. 15, 2002, http://web.archive.org/web/20021205151706/http://www.wallfire.org/wflogs/wflogs.8.html.

Microsoft Windows XP—Filter events in an event log, Jul. 2, 2004, http://web.archive.org/web/20040702070538/ http://www.microsoft.com/resources/documentation/windows/xp/all/proddocs/en-us/nt_filteringevents_how_ev.mspx.

The Cable Guy: Windows 2000 Routing and Remote Access Service—Jun. 2001, Jul. 22, 2004, http://web.archive.org/web/20040722111534/http://www.microsoft.com/technet/community/columns/cableguy/cg0601.mspx.

Maradon, How to Build a Web Sidget (Using jQuery)—Alex Marandon, Jun. 2010, https://web.archive.org/web/20100623004301/http://alexmarandon.com/articles/web_widget_jquery/.

USER ACCESS AUTHENTICATION BASED ON NETWORK ACCESS POINT

CROSS-REFERENCE TO RELATED APPLICATIONS

This application is a continuation and claims the priority benefit of U.S. patent application Ser. No. 13/423,953 filed on Mar. 19, 2012, now U.S. Pat. No. 8,782,751 issued on Jul. 15, 2014 and entitled "Systems and Methods for User Access Authentication Based on Network Access Point," which in turn is a continuation of U.S. patent application Ser. No. 11/435,043, filed May 16, 2006, now U.S. Pat. No. 8,151,322 issued on Apr. 3, 2012 and entitled "Systems and Methods for User Access Authentication Based on Network Access Point." The disclosures of the above-referenced applications are incorporated herein by reference.

FIELD OF THE INVENTION

This invention relates generally to data networking, more specifically, to systems and methods of authenticating user access based on an access point to a secure data network.

BACKGROUND OF THE INVENTION

The secure data network of a company is a critical component of day-to-day functioning of company business activities. One of the crucial operations of a secure data network is proper access control for a user.

Existing methods for access control to a secure data network are based on a user identity, such as a user name or an employee number, or based on a role associated with the user identity. For example, Roger Singleton's user identity "C12756013" associates with a role of a field support engineer. In another example, Verna Simpson's user identity "verna.simpson" associates with a role of a marketing manager. In one more example, Kimberly Nguyen's user identity "DC201319N" associates with a role of a human resources representative.

With the growing complexity of secure data networks, the variety of business activities conducted via the secure data networks, and particularly the diversity of locations for a user to access the secure data networks, access control based on user identity or its associated role is no longer adequate. For example, a user can access the secure data network of a company from within the company, from home via a public data network such as the Internet, or from a vacation resort via a cellular data network, such as a General Packet Radio Service (GPRS) network.

In one scenario, Kimberly uses her desktop computer in her office to access confidential salary information from the company's secure data network. During lunch time, she takes her laptop computer to a patio outside the company building and has lunch with several co-workers. As she continues her work during lunch, her co-workers walking past her accidentally see the salary information. Although the patio is a much less secure environment physically, compared to her office, Kimberly is nonetheless able to access the same sensitive information from the secure data network.

In another scenario, Verna of Company A visits Company B. She uses her laptop computer to access Company A's secure data network via a network of Company B. She accesses a confidential competitive marketing analysis to prepare for a meeting. In this scenario, the confidential information passes through the network of Company B, increasing the risk of leaking important marketing information of Company A to Company B. Likewise, although the network of Company B is a much less secure environment strategically and electronically, as viewed by and in comparison to that of Company A, Verna is nonetheless able to access the same sensitive information from the secure data network.

The above examples represent a security problem for a secure data network of a company, and they indicate the need for providing a solution for differential secure data network access control based on the network access point. Some work-arounds have been created to address related scenarios, but such work-arounds typically address only narrow aspects of the issue. For instance, one such work-around involves the use of wireless text pagers, such as Blackberry™ devices, that receive and send email from the user's company email account. Assuming that Company A provides Verna with a Blackberry™ to receive and send email using her Company A email account, Company A may still not want Verna to receive or send information confidential to Company A via email on her Blackberry™ device.

To help achieve Company A's desired result, Company A may implement a policy instructing its employees to electronically designate their emails as "Normal," "Confidential," "Private," or "Personal," as is possible using many email applications, such as MS Outlook™. In addition, Company A may configure its Blackberry™ email re-routing software so that emails electronically designated as "Confidential" are not sent ("pushed") to Verna's Blackberry™ device, while nonetheless pushing all Verna's other emails to her device. Likewise, Verna may be prevented from sending an email from her device that she designates as "Confidential." Emails designated as "Confidential" will, as usual, be available from Company A's secure data network, irrespective of where Verna may log-on with her laptop. However, such a work-around is only as good as the implementation of the underlying policy, placing significant reliance on the cooperation of Company A employees to properly designate emails, not to mention Company A's inability to police emails from business partners that may send mutually confidential information to Verna without electronically designating it as "Confidential."

SUMMARY

Systems and methods of authenticating user access based on an access point to a secure data network are described herein. A secure data network includes a network access point. The network access point serves as an entry point for a user to access the secure data network using a user device. The network access point may connect directly or indirectly to an identity server. The user is associated with a user identity. The association between the user and the user identity may be for a fixed or indefinite period of time. Any user controlling the user device is deemed to be associated with the user identity used to gain such control. The network access point associates with a network access point identity. The user uses a user device to send an access request to the network access point, requesting access to the secure data network. The access request may include the user identity, in which case the network access point obtains the user identity from the access request. Alternatively, the network access point obtains the user identity from other means. The network access point sends the identity server an authentication request. The authentication request includes the user identity. The identity server obtains the user identity from the authentication request. The authentication request may include the network access point identity, in which case the identity server obtains the network access point identity from the authentication request. Alternatively, the identity server may obtain the network access point identity from other means.

The identity server processes the authentication request by validating the combination of the user identity and the network access point identity. The identity server may include a datastore that includes information for a plurality of user identities and a plurality of network access point identities. The identity server may attempt to match the combination of user identity and network access point identity with information in the datastore, which may correspond to a plurality of valid pairs of user identity and network access point identity entries. In such a situation, the identity server may attempt to match the user identity and the network access point identity with one of the plurality of valid pairs of user identity and network access point identity. Based on the outcome of the matching attempt, the identity server responds with an authentication response to the authentication request. Furthermore, based on the authentication response, the secure network may grant access, or deny access, as communicated to the user device via an access response.

The identity server may determine that there is a match between a valid pair in datastore and the combination of user identity and network access point identity. Thus, the identity server determines that the combination of user identity and network access point identity is valid, in which case, the identity server responds positively to the authentication request, and the user device is granted access to the secure data network via the network access point.

Examples of the secure data network may include an Internet Protocol (IP) network; a Local Area Network (LAN); a Wide Area Network (WAN); a wireless network, such as a WiFi network or a General Packet Radio Service (GPRS) network; a public IP network such as the Internet; a private IP network such as a home network or a company network.

Examples of the user device may include a desktop personal computer, a laptop personal computer, a personal data assistance (PDA), a cellular phone, a smart-phone, or a device that includes a computing unit connectable to a network.

Examples of the user identity may include: a user name; an identity of user device, such as a Media Access Control (MAC) address, an Internet Protocol (IP) address and port number, a device serial number, or subscriber information in a subscriber identity module (SIM) card or Universal Subscriber Identity Module (USIM) card; a telephone number; security information such as a password, a security code or a secret answer to a security question; and/or biometric characteristics, such as fingerprints, fingerprints, eye retinas, eyes irises, voice or signature.

Examples of the network access point may include: a firewall, a wireless access point, a Dynamic Host Configuration Protocol (DHCP) server, a Remote Access Server (RAS), a Broadband Remote Access Server (BRAS), a web server, a secure web server, or a virtual private network (VPN) server; and/or a termination point of an access tunnel, such as a virtual private network (VPN) tunnel, a Generic Routing Encapsulation (GRE) tunnel, or a Layer-2 Tunnel Protocol (L2TP) tunnel.

Examples of the network access point identity may include: a network access point name; an IP address or a port number; security information such as a password or a security code; a device name or a machine identity such as a serial number; and/or other access information. In the event that the user device connects to network access point via an access tunnel, such as a VPN tunnel, an L2TP tunnel, or a GRE tunnel, the network access point identity may include an identity of the access tunnel termination point. In the event that the user device connects to network access point via a General Packet Radio Service (GPRS) network, the network access point identity may include an Access Point Name (APN).

The present invention likewise may apply where the secure data network comprises an application level secure data network. The user uses the user device to request access, via an access request, to an application level secure data network for a network application. When the network access point receives the access request, the network access point may determine that access to a specific network application is requested. The network access point then may send an authentication request to the identity server. After receiving the authentication request, the identity server processes the authentication request and responds with an authentication response, the consequences of which are communicated to the user device via an access response.

Examples of the network application may be, depending on the context: an enterprise application, an employee benefit application, a human resources salary administration application, or an inventory information application; a library system, a conference workshop application, a live concert webcast or a hotel television over IP application; and/or a web application.

To portray possible scenarios, for a single user using a single user device seeking access to a single desired network application, in which access may be granted and others in which it may not, the application level secure data network may include a first network access point and a second network access point. The first network access point is associated with a first network access point identity; the second network access point is associated with second network access point identity.

In one scenario, the user employs the user device to send a first application access request to the first network access point, requesting access to an application level secure data network for a desired network application. The first network access point sends the identity server a first authentication request. The identity server processes the first authentication request by validating the combination of the user identity and the first network access point identity. After processing the first authentication request, the identity server sends a first authentication response to the network, which communicates a first access response to the user device. If the identity server determines that the combined user identity and first network access point identity is valid, the user is granted access to access application level secure data network for the desired network application via use of user device at the first network access point.

In a different scenario, the user employs the user device to send a second application access request to the second network access point, requesting access to the application level secure data network for the desired network application, as above. The second network access point sends the identity server a second authentication request. The identity server processes the second authentication request by validating the combined user identity and second network access point identity. After processing the second authentication request, the identity server sends a second authentication response to the network, which communicates a second access response to the user device. If the identity server determines that the combined user identity and second network access point identity pair is not valid, then user is not granted access to access application level secure data network for the desired network application via use of the user device at second network access point.

Examples of the possible pairs of first and second network access points, vis-à-vis exemplary applications, include: (1)

an office area of the company and an outdoor patio area of the company, wherein the user may use the user device to access an enterprise application from the office area, but not from the outdoor patio area; (2) a company intranet and an external data network, such as the Internet, wherein the user may use the user device to access a human resources salary administration application from inside the company intranet, but not via the Internet at a downtown cafe that provides hotspot Internet access.

Variations on the basic concept of are also within the scope of the present invention. For instance, the identity server may validate the combined user identity and network access point identity in conjunction with time information, access allowance data, and/or traffic volume data.

BRIEF DESCRIPTION OF DRAWINGS

In the following figures, like references correspond to like components. For the purposes of illustrating the various aspects of the invention, there are shown in the drawings simplified forms, it being understood, however, that the invention is not limited to the precise arrangements shown, but rather only by the claims.

DETAILED DESCRIPTION

In the following description, for the purposes of explanation, specific numbers, materials and configurations are set forth in order to provide a thorough understanding of the invention. It will be apparent, however, to a person of ordinary skill in the art, that these specific details are merely exemplary embodiments of the invention. In some instances, well known features may be omitted or simplified so as not to obscure the present invention. Furthermore, reference in the specification to "one embodiment" or "an embodiment" is not meant to limit the scope of the invention, but instead merely provides an example of a particular feature, structure or characteristic of the invention described in connection with the embodiment. Insofar as various embodiments are described herein, the appearances of the phase "in an embodiment" in various places in the specification are not meant to refer to a single or same embodiment.

Figure 1:
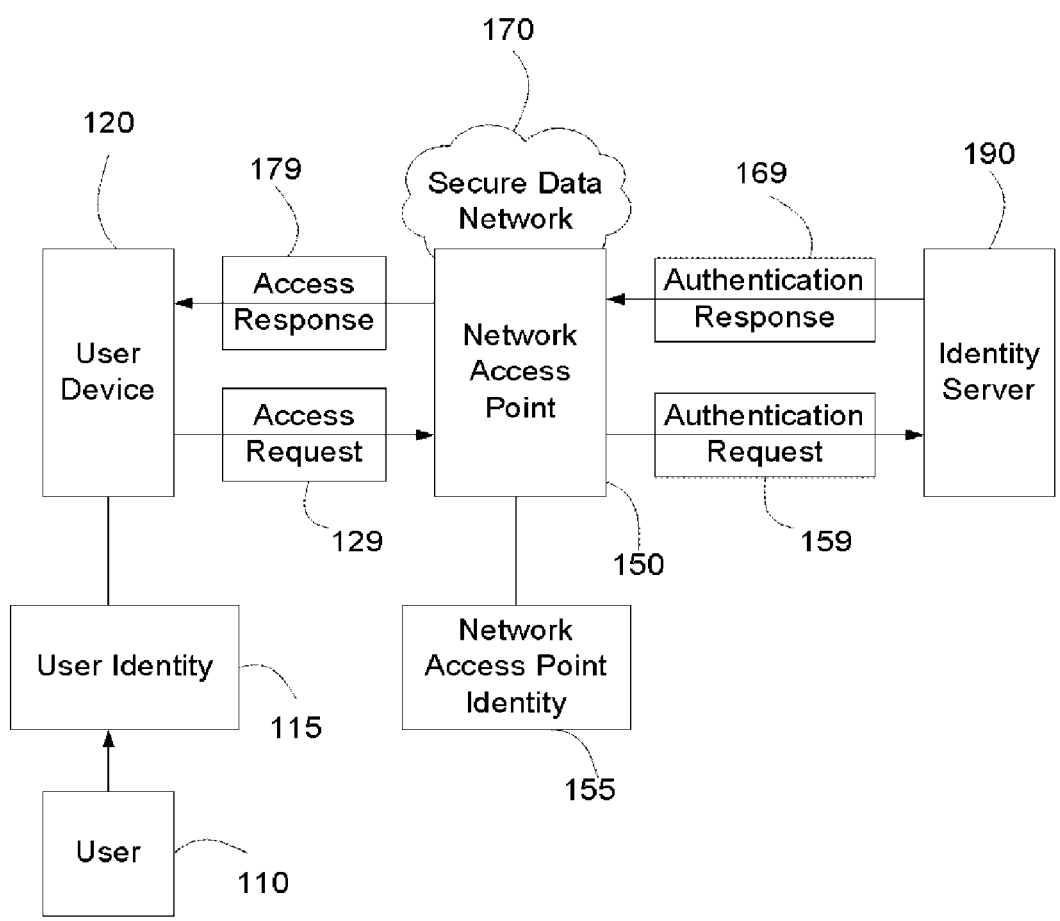
FIG. 1 illustrates a block diagram of exemplary interactions across a secure data network 170.

FIG. 1 illustrates a block diagram of exemplary interactions across a secure data network 170. A secure data network 170 includes a network access point 150. Network access point 150 serves as an entry point for a user 110 to access secure data network 170 using a user device 120. Network access point 150 connects to an identity server 190.

In one embodiment, secure data network 170 is an Internet Protocol (IP) network. In various embodiments, secure data network 170 includes a Local Area Network (LAN), a Wide Area Network (WAN), a wireless network, such as a WiFi network or a General Packet Radio Service (GPRS) network. In one embodiment, secure data network 170 includes a public IP network such as the Internet. In one embodiment secure data network includes a private IP network such as a home network or a company network.

In one embodiment, user device 120 is a desktop personal computer, a laptop personal computer, a personal data assistance (PDA), a cellular phone, a smartphone, or a device that includes a computing unit connectable to a network. A user 110 may control the user device 120 directly, as in personal configuration or physical operation, or indirectly, as in the vicarious use through remotely configured or operated systems.

User 110 is associated with user identity 115. For purposes of this invention, it is irrelevant whether user 110 is the intended user of user identity 115; i.e., even if user 110 is borrowing the user identity 115 of another user, user 110 is nonetheless associated with user identity 115 during such use. In one embodiment, user identity 115 includes a user name. In one embodiment, user identity 115 includes an identity of user device 120, such as a Media Access Control (MAC) address, an Internet Protocol (IP) address and port number, a device serial number, or subscriber information in a subscriber identity module (SIM) card or Universal Subscriber Identity Module (USIM) card. In one embodiment, user identity 115 includes a telephone number. In one embodiment, user identity 115 includes security information such as a password, a security code or a secret answer to a security question. In one embodiment, user identity 115 includes biometric characteristics, such as fingerprints, fingerprints, eye retinas, eyes irises, voice or signature.

In one embodiment, a network access point includes a firewall, a wireless access point, a Dynamic Host Configuration Protocol (DHCP) server, a Remote Access Server (RAS), a Broadband Remote Access Server (BRAS), a web server, a secure web server, or a virtual private network (VPN) server. In on embodiment, network access point 150 includes a termination point of an access tunnel, such as a virtual private network (VPN) tunnel, a Generic Routing Encapsulation (GRE) tunnel, or a Layer-2 Tunnel Protocol (L2TP) tunnel.

Network access point 150 associates with network access point identity 155. In various embodiments, network access point identity 155 includes a network access point name, an IP address or a port number, security information such as a password or a security code, a device name or a machine identity such as a serial number, or other access information. In one embodiment, user device 120 connects to network access point 150 via an access tunnel, such as a VPN tunnel, an L2TP tunnel, or a GRE tunnel, in which case network access point identity 155 includes an identity of the access tunnel termination point. In one embodiment, user device 120 connects to network access point 150 via a General Packet Radio Service (GPRS) network, in which case network access point identity 155 includes an Access Point Name (APN).

User 110 uses user device 120 to send an access request 129 to network access point 150, requesting access to secure data network 170. In one embodiment, access request 129 includes user identity 115, in which case network access point 150 obtains user identity 115 from access request 129. In another embodiment, network access point 150 obtains user identity 115 from other means. In one embodiment, access request 129 is an IP packet, user identity 115 includes an IP address, and the network access point 150 extracts the IP address from the source address field in the IP header of access request 129.

Network access point 150 sends identity server 190 an authentication request 159. Network access point 150 may generate the authentication request 159 using an authentication request engine, not shown, within network access point 150. Authentication request 159 includes user identity 115. Identity server 190 obtains user identity 115 from authentication request 159. In one embodiment, authentication request 159 includes network access point identity 155, and identity server 190 obtains network access point identity 155 from authentication request 159. In another embodiment, identity server 190 obtains network access point identity 155 from other means. In one embodiment, authentication request 159 is an IP packet and network access point identity 155 includes an IP address, in which case identity server 190 extracts the IP address from the source address field in the IP header of authentication request 159.

Identity server 190 processes authentication request 159 by validating the combined user identity 115 and network access point identity 155. In one embodiment, identity server 190 determines that the combined user identity 115 and network access point identity 155 is valid, in which case user 110 can use user device 120 to access secure data network 170.

Figure 2:
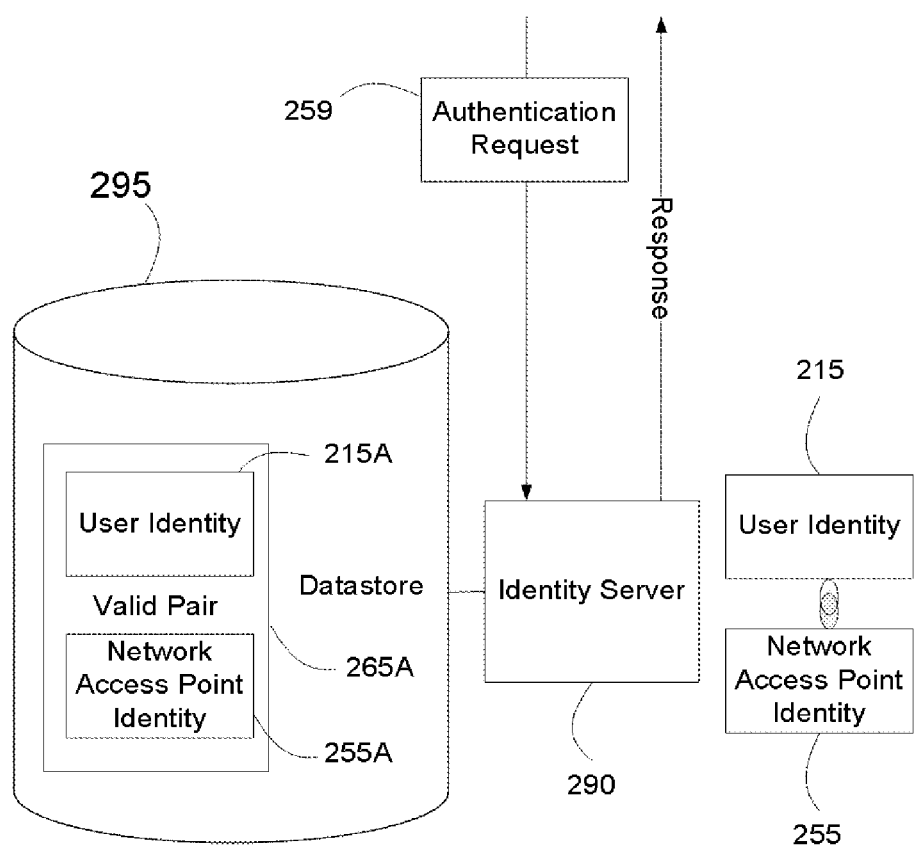
FIG. 2 illustrates a block diagram of the flow of data during an exemplary process 240 for identity server 290 to process an authentication request 259.

FIG. 2 illustrates a block diagram of the flow of data during an exemplary process 240 for identity server 290 to process an authentication request 259. The exemplary process 240 appears in FIG. 2A, which illustrates a block diagram of the steps 241-248 of the exemplary process 240.

In preparation of an authentication request 259, the user identity 215 and network access point identity 255 are collected, as in steps 241A and 241B. In step 242, the authentication request 259 is sent from the network access point 150, and identity server 290 receives an authentication request 259 in step 243. In step 244, identity server 290 obtains user identity 215 from authentication request 259.

In one embodiment, identity server 290 obtains network access point identity 255 from authentication request 259. In one embodiment, authentication request 259 is an Access-Request packet based on Remote Authentication Dial In User Service (RADIUS) authentication protocol described in IETF RFC 2865 "Remote Authentication Dial In User Service (RADIUS)". In this case, identity server 290 extracts, or parses, user identity 215 from the RADIUS Access-Request packet. For example, user identity 215 may include a user name, in which case identity server 290 extracts the user name from User-Name attribute in the RADIUS Access-Request packet. Likewise, user identity 215 may include a password, which identity server 290 would extract from the RADIUS Access-Request packet in the User-Password attribute. In another embodiment, identity server 290 might extract the password from CHAP-Password attribute in the RADIUS Access-Request packet. In a further embodiment, user identity 215 may include a telephone number, leading identity server 290 to extract the telephone number from Calling-Station-Id in the RADIUS Access-Request packet. In other embodiments, user identity 215 may include other information, such as subscriber information or biometric characteristics, in which cases identity server 290 extracts the other information from Vendor-Specific attribute in the RADIUS Access-Request packet.

In step 245, identity server 290 parses the network access point identity 255 data, such as by extracting the network access point identity 255 from the RADIUS AccessRequest packet. In one embodiment, network access point identity 255 includes an IP address, and identity server 290 may extract the IP address from NAS-IP-Address attribute in the RADIUS Access-Request packet. In another embodiment, network access point identity 255 may include a physical port number, wherein identity server 290 extracts the physical port number from NAS-Port attribute in the RADIUS Access-Request packet. In another embodiment, network access point identity 255 may include a physical port type, and identity server 290 may extract the physical port type from NASPort-Type attribute in the RADIUS Access-Request packet. In other embodiments, network access point identity 255 may include other information, such as an identity of a terminating point of an L2TP tunnel, a GRE tunnel, or a VPN tunnel, in which cases identity server 290 may extract the other information from Vendor-Specific attribute in the RADIUS Access-Request packet.

In step 246, identity server 290 processes authentication request 259 by validating the combined user identity 215 and network access point identity 255. In one embodiment, identity server 290 includes a datastore 295 that includes information for a plurality of user identities 215 and a plurality of network access point identities 255. Identity server 290 may attempt to match the combination of user identity 215 and network access point identity 255 with information in datastore 295, using a validation matching engine, not shown, associated with identity server 290.

In one embodiment, datastore 295 includes a plurality of valid pairs 265A of user identity 215A and network access point identity 255A entries. In such a situation, identity server 290 may attempt to match user identity 215 and network access point identity 255 with one of the plurality of user identity 215A and network access point identity 255A of the valid pairs 265A. Based on the outcome of the matching attempt, identity server 290 responds in step 247 with an authentication response 169 to the authentication request 259. The authentication response 169 may be generated using an authentication response engine, not shown, associated with identity server 290. Furthermore, based on the authentication response 169, the secure network 170 may grant access, as in step 248A, or deny access, as in step 248B, as communicated to the user device via an access response 179. The access response 179 may be generated using an access response engine, not shown, associated with network access point 150.

While the identity server 290 may perform all its steps in a single server, the identity server 290 may comprise, in fact, more than one server, wherein the sequential steps associated with identity server 290 may be performed by separate servers. For instance, the processing step may queue the authentication requests 259 and prepare them for the validation matching engine. This processing step may occur outside a firewall of the secure data network 170, whereas the validation matching engine and the datastore 295 may be on a separate server inside the firewall of the secure data network 170. Once the attempt to match is complete, the validation matching engine may communicate to the authentication response engine, which may be outside the firewall, that a match or no match exists, for creation of the authentication response 169.

In one embodiment, identity server 290 determines that there is a match between a valid pair 265A in datastore 295 and the combination of user identity 215 and network access point identity 255. Thus, identity server 290 determines that the combination of user identity 215 and network access point identity 255 is valid. In one embodiment, identity server 290 responds positively to authentication request 259, such as in step 248A. In one embodiment, identity server 290 responds positively, via authentication response 169, by sending a RADIUS Access-Accept packet, indicating that the attributes in the RADIUS Access-Request packet are acceptable.

In a different embodiment, authentication request 259 is based on a different authentication protocol, such as DIAMETER described in IETF RFC 3588 "Diameter Base Protocol." In such a situation, identity server 290 may extract user identity 215 and network access point identity 255 according to the different authentication protocol. In yet another embodiment, authentication request 259 may be based on a proprietary Application Programming Interface (API). Identity server 290 likewise would extract user identity 215 and network access point identity 255 according to the API.

Figure 3:
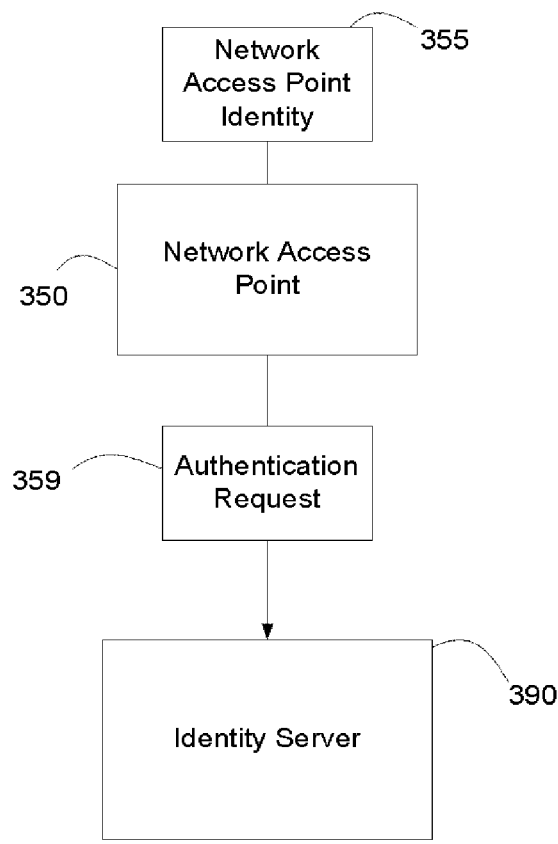
FIG. 3 illustrates a block diagram of the flow of data during a further embodiment of a process for identity server 390 to determine network access point identity 355 from communication information.

FIG. 3 illustrates a block diagram of the flow of data during a further embodiment of a process for identity server 390 to determine network access point identity 355 from communication information. Network access point 350 is associated with network access point identity 355. Network access point 350 communicates with identity server 390 and sends authentication request 359 to identity server 390. Identity server 390 receives authentication request 359.

In one embodiment, network access point 350 may communicate to identity server 390 over an IP network, in which case authentication request 359 may be an IP packet. Network access point identity 355 likewise may include an IP address. Identity server 390 may then extract the IP address from the source address field in the IP header of authentication request 359.

In an additional embodiment, authentication request 359 is a User Datagram Protocol (UDP) packet, in which case network access point identity 355 may include a port number, and the identity server 390 may extract the port number from the source port field in the UDP header of authentication request 359.

In another embodiment, authentication request 359 may be a Transport Control Protocol (TCP) packet, in which case network access point identity 355 may include a port number, and identity server 390 may extract the port number from the source port field in the TCP header of authentication request 359.

In a further embodiment, authentication request 359 may be a VPN tunnel mode packet, in which case network access point identity 355 may include an IP address of the VPN tunnel, in which case identity server 390 may extract the VPN tunnel IP address from the source address field in the outer IP header of authentication request 359. An example of a tunnel mode header is described in section 5.1.2 "Header Construction for Tunnel Mode" in IETF RFC 4301 "Security Architecture for the Internet Protocol".

Figure 4:
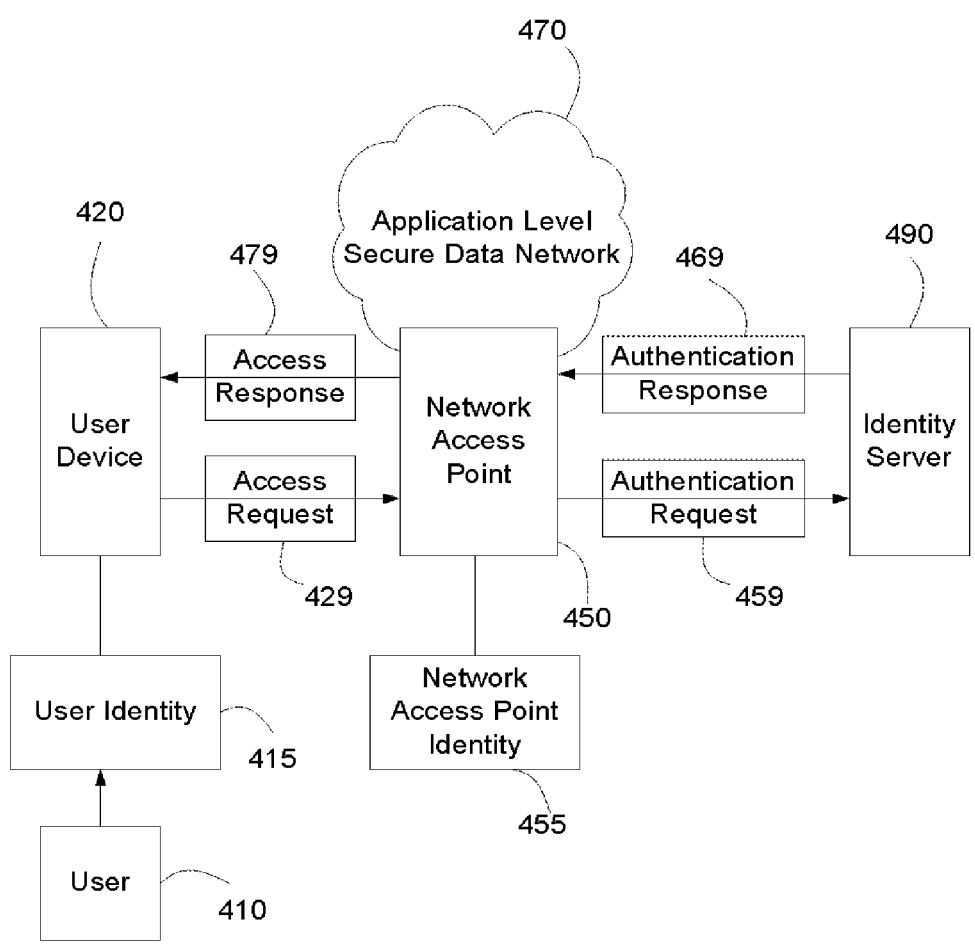
FIG. 4 illustrates a block diagram of exemplary interactions across an application level secure data network 470.

FIG. 4 illustrates a block diagram of exemplary interactions across an application level secure data network 470. Application level secure data network 470 is a variation of secure data network 170. User 410 uses user device 420 to request access, via an application access request 429, to an application level secure data network 470 for a network application. In accordance with various embodiments of the present invention, the network application may be, for example, an enterprise application, an employee benefit application, a human resources salary administration application, or an inventory information application. In other embodiments, the network application may be, for instance, a library system, a conference workshop application, a live concert webcast or a hotel television over IP application. In still further embodiments, the network application may be a web application.

In one embodiment, the network application uses TCP protocol for communication. User device 420 may send an application access request 429. Application access request 429 may be a TCP SYN packet. The TCP SYN packet may include a TCP header and an IP header.

When network access point 450 receives the TCP SYN packet, network access point 450 may determine that access to a specific network application is requested. In particular, network access point 450 may extract the port number from the destination port field in the TCP header of the TCP SYN packet, and then network access point 450 may determine that the port number matches the specific network application. Network access point 450 then may send an authentication request 459 to identity server 490.

In one embodiment, network access point 450 may extract the IP address from the source address field in the IP header of the TCP SYN packet, in which case network access point 450 may include the IP address in user identity 415. In another embodiment, network access point 450 may determine the user identity 415 based on the IP address.

Network access point 450 may include user identity 415 in authentication request 459, which the network access point 450 then send to identity server 490. In one embodiment, network access point 450 may include in authentication request 459 the network access point identity 455 that is associated with network access point 450.

In another embodiment, the network application may use Hypertext Transfer Protocol (HTTP) for communication, in which case, when the user device 420 sends an application access request 429, the application access request 429 may be an HTTP packet that, for instance, may include a header. When network access point 450 receives the HTTP packet, network access point 450 may determine based on the header that access to a specific network application is requested. For example, the header may include a URL, and the network application may be determined by a sub-string in the URL. In another embodiment, the header may include an HTML tag that identifies the network application. In a further embodiment, the HTTP packet may be a GET request, and the network application may be determined by a sub-string in the GET request.

In one embodiment, network access point 450 may extract the IP address from the source address field in the IP header of the HTTP packet. Network access point 450 may include the IP address in user identity 415. In another embodiment, network access point 450 may determine user identity 415 based on the IP address. In another embodiment, network access point 450 may extract information from an HTTP header, which, for example, may include user information, and the network access point 450 may extract this user information from the HTTP header. The network access point 450 may include the user information in user identity 415. For instance, network access point 450 may determine user identity 415 based on the user information.

Network access point 450 includes user identity 415 in authentication request 459 and sends authentication request 459 to identity server 490. In one embodiment, network access point 450 includes network access point identity 455 that is associated with network access point 450 in authentication request 459. After receiving the authentication request 459, identity server 490 processes the authentication request 459 and responds with an authentication response 469, the consequences of which are communicated to the user device 420 via an access response 479.

Figure 5:
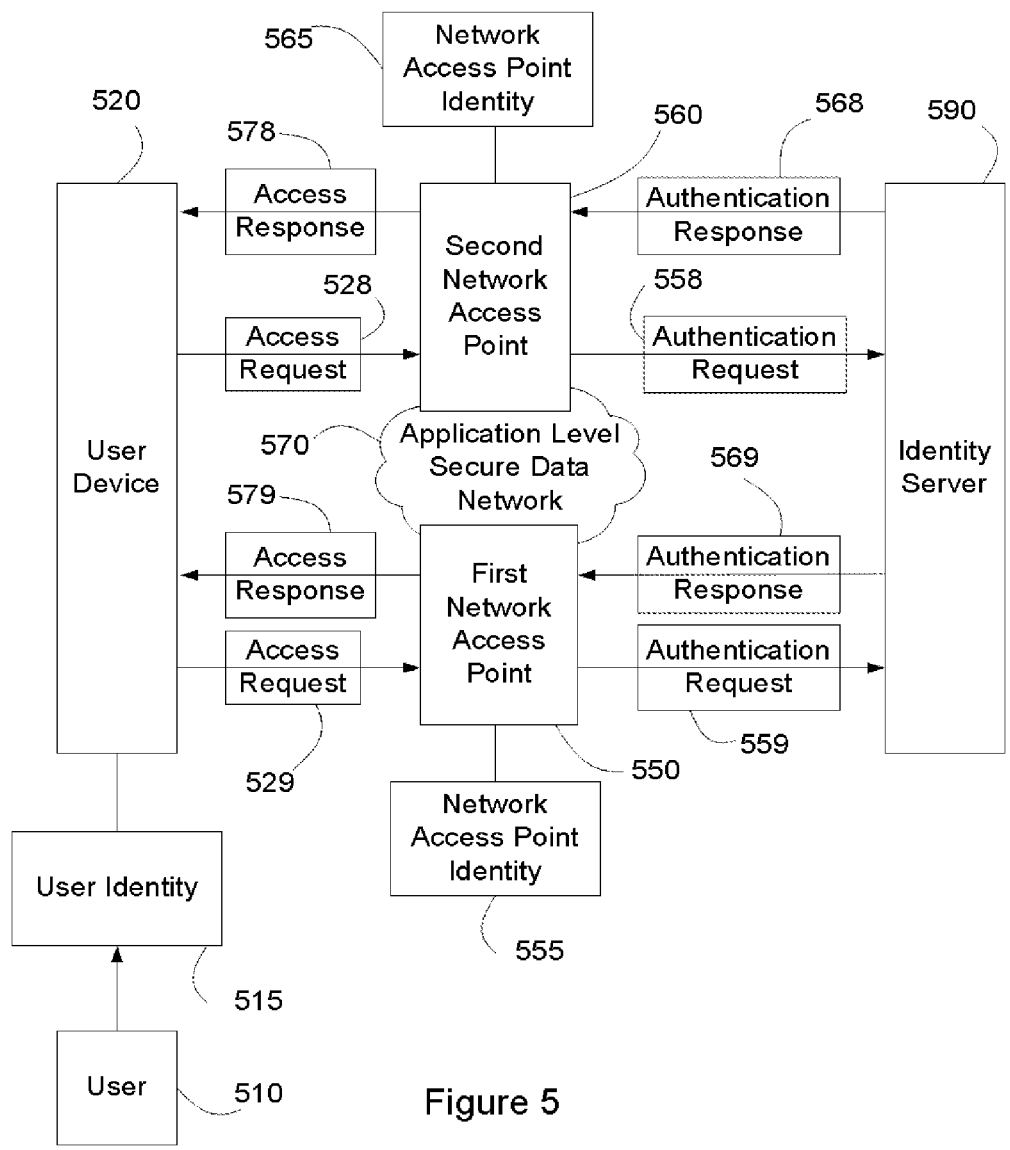
FIG. 5 illustrates a block diagram of exemplary interactions across an application level secure data network 570 with a first network access point 550 and a second network access point 560.

FIG. 5 illustrates a block diagram of exemplary interactions across an application level secure data network 570 with a first network access point 550 and a second network access point 560. Although depicted in the specific context of an application level secure data network 570, the same principles of FIG. 5 apply to a general secure data network 170 having more than one network access point 150.

An application level secure data network 570 includes a first network access point 550 and a second network access point 560. The first network access point 550 is associated with first network access point identity 555; the second network access point 560 is associated with second network access point identity 565. User 510 is associated with user identity 515.

Figure 2A:
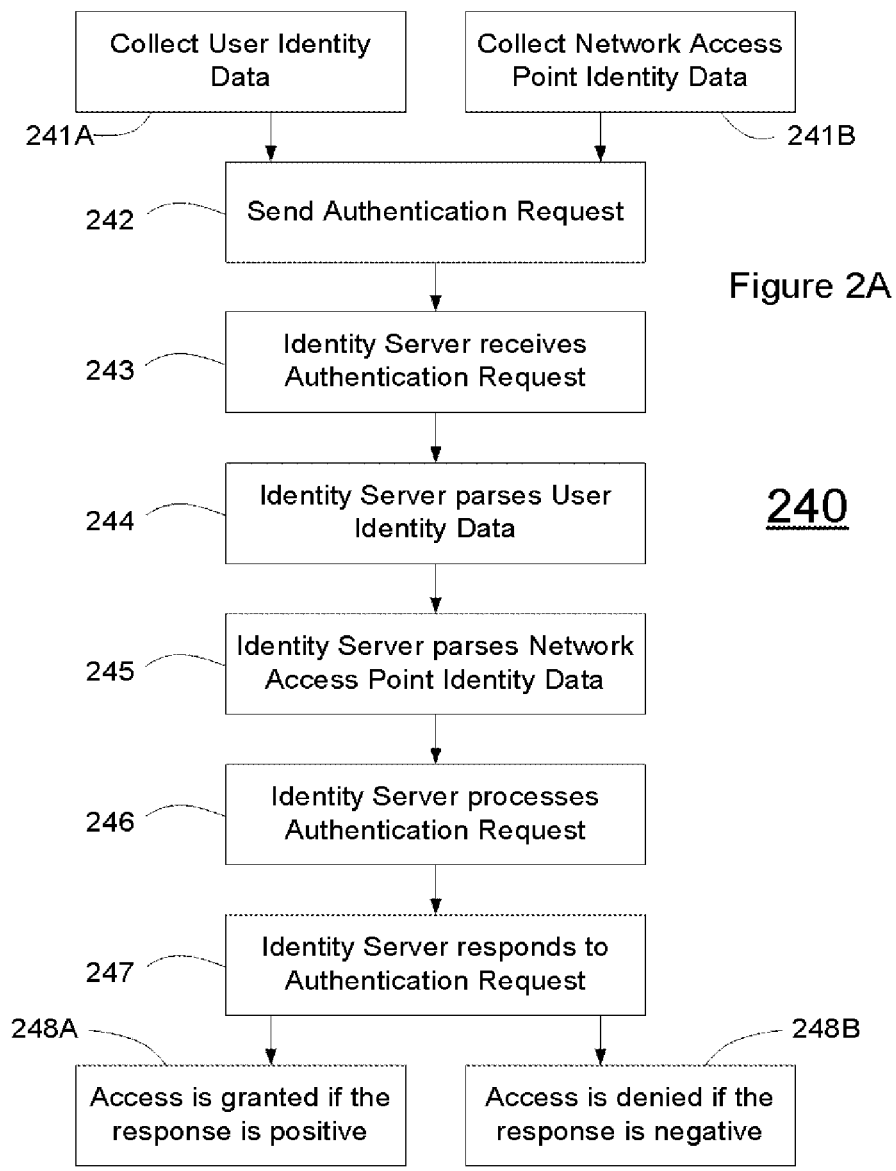
FIG. 2A illustrates a block diagram of the steps 241-248 of the exemplary process 240 for identity server 290 to process an authentication request 259.

In one embodiment, user 510 employs user device 520 to send a first application access request 529 to the first network access point 550, requesting access to application level secure data network 570 for a network application. The first network access point 550 sends identity server 590 a first authentication request 559. Identity server 590 processes first authentication request 559 by validating the combined user identity 515 and first network access point identity 555 as illustrated in FIG. 2A. After processing the first authentication request 559, identity server 590 sends a first authentication response 569 to the application level secure data network 570, which communicates a first access response 579 to user device 520. If identity server 590 determines that the combined user identity 515 and first network access point identity 555 is valid, user 510 is granted access to access application level secure data network 570 for the network application via user device 520 at first network access point 550.

In a different scenario, user 510 employs user device 520 to send a second application access request 528 to the second network access point 560, requesting access to application level secure data network 570 for the same network application as above. The second network access point 560 sends identity server 590 a second authentication request 558. Identity server 590 processes second authentication request 558 by validating the combined user identity 515 and second network access point identity 565 as illustrated in FIG. 2A. After processing the second authentication request 558, identity server 590 sends a second authentication response 568 to the network 570, which communicates a second access response 578 to user device 520. If identity server 590 determines that the combined user identity 515 and second network access point identity 565 is not valid, then user 510 is not granted access to access application level secure data network 570 for the same network application via user device 520 at second network access point 560.

Given the interconnecting nature of a secure data network 170 and an application level secure data network 470/570, it is possible that the second authentication request 558 may not travel directly to the identity server 590. It may pass through various network components, such as hubs, switching stations, base stations, hosting servers, etc., before reaching the identity server 590. Authentication request 558 may pass also through first network access point 550 on its way to identity server 590. However, even if authentication request 558 passes through first network access point 550, it is clear that the authentication request 558 should reflect that the user 510 is attempting to access the secure data network 570 via second network access point 560. Thus, the reality of the attempted access is preserved, and user device 520 is not granted access due to passing through first network access point 550 if access would be denied based on sending the access request 528 to second network access point 560.

As with other network communications, the first authentication request 559 may keep a log of its communication path, tracking the identities of network nodes in reaching its destination. The communication path of the authentication request, and that of the possible access if granted, likewise may be the subject of scrutiny for potential security weaknesses, and the identity server 590 may deny access if the path itself contains a weak link in the chain of communication. The identity server 590 may treat the network node identities tracked in the communication log of the first authentication request 559 as network access point identities 555/565. In such a case, the identity server 590 may be configured to determine that access should be granted only where all network access point identities 555/565 along the communication path combine as valid pairs 265A with the user identity 515.

According to one exemplary embodiment of the present invention, application level secure data network 570 is a company data network. The first network access point 550 serves as an entry point for accessing application level secure data network 570 from an office area of the company. The second network access point 560 serves as an entry point for accessing application level secure data network 570 from an outdoor patio area of the company. The application level secure data network 570 may be configured so that user 510 can use user device 520 to access application level secure data network 570 for an enterprise application from the office area, but cannot access application level secure data network 570 for the same enterprise application from the outdoor patio area.

According to an additional embodiment, the first network access point 550 serves as an entry point for accessing application level secure data network 570 via a company intranet. The second network access point 560 serves as an entry point for accessing application level secure data network 570 via an external data network, such as the Internet. The application level secure data network 570 may be configured so that user 510 can use user device 520 to access application level secure data network 570 for a human resources salary administration application from inside the company intranet, but cannot access application level secure data network 570 for the same human resources salary administration application at a downtown cafe that provides hotspot Internet access.

In some cases, the network application may use a different protocol for communication, in which cases the first network access point 550 may need to obtain user identity 515 based on this different protocol. For instance, the different protocol may be User Datagram Protocol (UDP), File Transfer Protocol (FTP), Session Initiation Protocol (SIP), or Real-Time Streaming Protocol (RTSP). In other instances, the network application may use an Extensible Markup Language (XML) document for communication, in which case the first network access point 550 may obtain user identity 515 based on the Document Type Definition (DTD) for the XML document. Moreover, the network application may use a Web service interface, and the first network access point 550 may rely on the Web service interface to obtain user identity 515.

Variations on the basic concept of are also within the scope of the present invention. For instance, identity server 590 may validate the combined user identity 515 and first network access point identity 555 in conjunction with time information. In one embodiment, the validity of the combined user identity 515 and first network access point identity 555 may depend on the time of day when identity server 590 conducts the validation. In another embodiment, identity server 590 validates the combined user identity 515 and first network access point identity 555 in conjunction with access allowance. Access allowance may be measured in various ways, such time duration, download volume, network traffic volume, etc., or combinations thereof. For example, the validity of the combined user identity 515 and first network access point identity 555 may depend on the access allowance, as measured in access time duration in light of access traffic volume associated with the user identity 515 and the first network access point identity 555, such as limits of 2 hours or 2 gigabytes of data transfer, which occurs sooner.

In yet further embodiments, the application level secure data network 570 may be deployed in a high school campus, a college campus, a hospital, a warehouse, a hotel, an airport, a stadium, an amphitheater, or a cruise ship, to provide for differential network access control based on the point of access. Moreover, the application level secure data networks 570 may be deployed for differential charging based on the access point to the application level secure data network.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of user access authentication, the method comprising:
   receiving a first authentication request at an identity server from a second network access point, based on a user device access request for accessing a secure data network through a first network access point;
   obtaining from the first authentication request a first network access point identity of the first network access point and a second network access point identity of the second network access point;
   determining at the identity server whether to grant a user device access to the secure data network by comparing a user identity and the first network access point identity to a stored plurality of user identities and corresponding validated pairs of network access point identities; and
   granting access to the secure data network when the user identity and the first network access point identity obtained match with one of the stored plurality of user identities and corresponding validated pairs of network access point identities.

2. The method of claim 1 further comprising maintaining a log of communication paths which tracks at least one of the first and second network access point identities.

3. The method of claim 2 wherein the first authentication request logs at least a portion of the communication paths.

4. The method of claim 2 comprising logging the first network access point identity and the second network access point identity.

5. The method of claim 1 wherein the secure data network comprises an application level secure data network.

6. The method of claim 5 wherein the access request seeks access to a network application, and the access request comprises a Transport Control Protocol (TCP) access request.

7. The method of claim 6 further comprising determining that access to the network application is sought, wherein the first network access point determines that access to the network application is sought.

8. The method of claim 6 wherein the network application comprises one or more of an enterprise application, an employee benefit application, a human resources application, an inventory information application, a library system, a conference workshop application, a live concert webcast, a hotel television over IP application, or a web application.

9. A system for user access authentication, the system comprising:
   a secure data network comprising at least a first network access point and a second network access point, the first network access point transmits a first authentication request from the second network access point to an identity server, based on a user device access request for accessing the secure data network through the first network access point;
   the identity server in communication with the secure data network via one of the network access points; wherein
   the identity server obtains from the first authentication request a first network access point identity of the first network access point and a second network access point identity of the second network access point;
   determines whether to grant a user device access to the secure data network by comparing a user identity and the first network access point identity to a stored plurality of user identities and corresponding validated pairs of network access point identities; and
   grants access to the secure data network when the user identity and the first network access point identity obtained match with one of the stored plurality of user identities and corresponding validated pairs of network access point identities.

10. The system of claim 9 further comprising a log of communication paths which tracks at least one of the first and second network access point identities.

11. The system of claim 10 wherein the first authentication request logs at least a portion of the communication paths.

12. The system of claim 10 wherein the log comprises at least the first network access point identity and second network access point identity.

13. The system of claim 9 wherein the secure data network comprises an application level secure data network.

14. The system of claim 13 wherein the access request comprises a Transport Control Protocol (TCP) and seeks access to a network application.

15. The system of claim 14 wherein the first network access point determines that access to the network application is being sought.

16. The system of claim 14 wherein the network application comprises one or more of an enterprise application, an employee benefit application, a human resources application, an inventory information application, a library system, a conference workshop application, a live concert web cast, a hotel television over IP application, and a web application.

17. A method of user access authentication, the method comprising:
   receiving at a first network access point an access request to a secure data network from a user device;
   generating an authentication request in response to receiving the access request, wherein the authentication request comprises a log of a communication path;
   sending the authentication request from the first network access point via a second network access point to an identity server for processing;
   obtaining from the authentication request a first network access point identity of the first network access point and a second network access point identity of the second network access point;
   determining at the identity server whether to grant the user device access to the secure data network by comparing a user identity and the first and second access network point identities to a stored plurality of user identities and corresponding validated pairs of network access point identities; and
   granting access to the secure data network when the user identity and the network access point identities obtained match with one of the stored plurality of user identities and its corresponding validated pairs of network access point identities.

18. The method of claim 17 wherein the log of the communication path comprises the second network access point when the authentication request passes through the second network access point.

19. The method of claim 17 comprising sending an access response to the user device.

20. The method of claim 17 wherein the access request comprises the user identity and the authentication request comprises the user identity.

21. The method of claim 17 comprising the identity server determining whether to grant the access request based on the user identity, first network access point identity of the first network access point, and the second network access point identity of the second network access point.

22. The method of claim 17 wherein the secure data network comprises an application level secure data network.

23. The method of claim 22 wherein the access request seeks access to a network application, and the access request comprises a Transport Control Protocol (TCP) access request.

24. The method of claim 23 further comprising determining that access to the network application is sought, wherein the first network access point determines that access to the network application is sought.

25. The method of claim 23 wherein the network application comprises one or more of an enterprise application, an employee benefit application, a human resources application, an inventory information application, a library system, a conference workshop application, a live concert web cast, a hotel television over IP application, or a web application.

26. The method of claim 17 wherein the secure data network comprises at least one of an Internet Protocol (IP) network, a Local Area Network (LAN), a Wide Area Network (WAN), a wireless network, a WiFi network, a General Packet Radio Service (GPRS) network, a public IP network, and a private IP network;

wherein the user device comprises at least one of a desktop personal computer, a laptop personal computer, a personal data assistance (PDA), a cellular phone, a smartphone, and a device having a computing unit connectable to a network;

wherein the first network access point and/or the second network access point comprises at least one of a firewall, a wireless access point, a Dynamic Host Configuration Protocol (DHCP) server, a Remote Access Server (RAS), a Broadband Remote Access Server (BRAS), a web server, a secure web server, a virtual private network (VPN) server, a termination point of an access tunnel, a termination point of a virtual private network (VPN) tunnel, a termination point of a Generic Routing Encapsulation (GRE) tunnel, and a termination point of a Layer-2 Tunnel Protocol (L2TP) tunnel; and wherein the first network access point identity and/or the second network access point identity comprises at least one of a network access point name, an IP address, a port number, security information, a password, a security code, a device name, a machine identity, a serial number, an identity of an access tunnel termination point, and an Access Point Name (APN).

27. The method of claim 20 wherein the user identity comprises at least one of a user name, an identity of the user device, a Media Access Control (MAC) address, an Internet Protocol (IP) address and port number, a device serial number, subscriber information in a subscriber identity module (SIM) card, subscriber information in a Universal Subscriber Identity Module (USIM) card, a telephone number, security information, a password, a security code, a secret answer to a security question, biometric characteristics, fingerprint data, eye retinal data, eye iris data voice pattern recognition data and signature recognition data.

28. A system for user access authentication comprising:
a secure data network comprising at least a first network access point and a second network access point, and an identity server, wherein the first network access point receives an access request to the secure data network from a user device;

wherein the system generates an authentication request in response to receiving the access request, the authentication request comprising a log of a communication path;

sends the authentication request from the first network access point via the second network access point to the identity server for processing;

obtains from the authentication request a first network access point identity of the first network access point and a second network access point identity of the second network access point;

determines at the identity server whether to grant the user device access to the secure data network by comparing a user identity and the first and second network access point identities to a stored plurality of user identities and corresponding validated pairs of network access point identities; and grants access to the secure data network when the user identity and the network access point identities obtained match with one of the stored plurality of user identities and its corresponding validated pair of network access point identities.

29. The system of claim 28 wherein the log of the communication path comprises the second network access point when the authentication request passes through the second network access point.

30. The system of claim 28 wherein the identity server determines whether to grant the access request based on the user identity, the first network access point identity of the first network access point, and the second network access point identity of the second network access point.

31. The system of claim 28 wherein the secure data network comprises at least one of an Internet Protocol (IP) network, a Local Area Network (LAN), a Wide Area Network (WAN), a wireless network, a WiFi network, a General Packet Radio Service (GPRS) network, a public IP network, and a private IP network;

wherein the user device comprises at least one of a desktop personal computer, a laptop personal computer, a personal data assistance (PDA), a cellular phone, a smartphone, and a device having a computing unit connectable to a network;

wherein the first network access point and/or the second network access point comprises at least one of a firewall, a wireless access point, a Dynamic Host Configuration Protocol (DHCP) server, a Remote Access Server (RAS), a Broadband Remote Access Server (BRAS), a web server, a secure web server, a virtual private network (VPN) server, a termination point of an access tunnel, a termination point of a virtual private network (VPN) tunnel, a termination point of a Generic Routing Encapsulation (GRE) tunnel, and a termination point of a Layer-2 Tunnel Protocol (L2TP) tunnel; and wherein the first network access point identity and/or the second network access point identity comprises at least one of a network access point name, an IP address, a port number, security information, a password, a security code, a device name, a machine identity, a serial number, an identity of an access tunnel termination point, and an Access Point Name (APN).

32. The system of claim 28 wherein the access request comprises the user identity which comprises at least one of a user name, an identity of the user device, a Media Access Control (MAC) address, an Internet Protocol (IP) address and port number, a device serial number, subscriber information in a subscriber identity module (SIM) card, subscriber information in a Universal Subscriber Identity Module (USIM) card, a telephone number, security information, a password, a security code, a secret answer to a security question, biometric characteristics, fingerprint data, eye retinal data, eye iris data, voice pattern recognition data, and signature recognition data.

* * * * *

UNITED STATES PATENT AND TRADEMARK OFFICE
CERTIFICATE OF CORRECTION

| | | |
|---|---|---|
| PATENT NO. | : 9,344,421 B1 | Page 1 of 1 |
| APPLICATION NO. | : 14/290914 | |
| DATED | : May 17, 2016 | |
| INVENTOR(S) | : Lee Chen et al. | |

It is certified that error appears in the above-identified patent and that said Letters Patent is hereby corrected as shown below:

In the Claims
At column 14, line 62, after the word "second" insert the word --network--
At column 14, line 62, after the word "access" delete the word "network"
At column 15, line 15, after the first instance of the word "identity," insert the word --the--

Signed and Sealed this
Sixteenth Day of August, 2016

Michelle K. Lee
*Director of the United States Patent and Trademark Office*